United States Patent
Sorge

(10) Patent No.: US 9,422,877 B2
(45) Date of Patent: Aug. 23, 2016

(54) SYSTEM AND METHOD FOR CONTROL OF EXHAUST GAS RECIRCULATION (EGR) UTILIZING PROCESS TEMPERATURES

(71) Applicant: General Electric Company, Schenectady, NY (US)

(72) Inventor: Gregory Walter Sorge, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 14/052,243

(22) Filed: Oct. 11, 2013

(65) Prior Publication Data
US 2015/0101580 A1 Apr. 16, 2015

(51) Int. Cl.
*F02D 41/00* (2006.01)

(52) U.S. Cl.
CPC ....... *F02D 41/0072* (2013.01); *F02D 41/0047* (2013.01); *F02D 2041/0067* (2013.01); *F02D 2200/0414* (2013.01); *F02D 2200/0606* (2013.01); *Y02T 10/47* (2013.01)

(58) Field of Classification Search
CPC .............. F02D 41/00; F02D 41/0047; F02D 41/0072; F02D 2200/0414; F02D 2200/0606; F02D 2041/0067; F02M 25/0722; F02M 25/0724; F02M 25/0757; Y02T 10/121; Y02T 21/144
USPC ............ 123/568.11, 568.12, 568.16, 568.21, 123/568.22; 701/108
See application file for complete search history.

(56) References Cited

U.S. PATENT DOCUMENTS

| | | |
|---|---|---|
| 3,680,534 A | 8/1972 | Chavant |
| 4,426,848 A | 1/1984 | Stachowicz |
| 4,756,285 A | 7/1988 | Pischinger |
| 5,014,203 A * | 5/1991 | Miyazaki ........... F02M 25/0702 123/568.16 |
| 5,273,019 A | 12/1993 | Matthews et al. |
| 5,333,456 A | 8/1994 | Bollinger |
| 5,426,936 A | 6/1995 | Levendis et al. |
| 5,440,880 A | 8/1995 | Ceynow et al. |
| 5,520,161 A * | 5/1996 | Klopp ................. F02D 41/0072 123/568.24 |

(Continued)

FOREIGN PATENT DOCUMENTS

| | | |
|---|---|---|
| DE | 2449954 A1 | 4/1975 |
| EP | 1288469 A1 | 3/2003 |
| GB | 1447124 A | 8/1976 |

OTHER PUBLICATIONS

European Search Report and Opinion issued in connection with corresponding EP Application No. 14187998.1 on Feb. 20, 2015.

*Primary Examiner* — John Kwon
*Assistant Examiner* — Johnny H Hoang
(74) *Attorney, Agent, or Firm* — Fletcher Yoder P.C.

(57) ABSTRACT

A system includes a reciprocating internal combustion engine with one or more reaction zones configured to receive a charge flow that is configured to react within the one or more reaction zones, thereby forming an exhaust gas flow, and a controller. The charge flow includes an oxidant flow, a fuel flow, and a recirculated portion of the exhaust gas flow. The controller is configured to control a ratio of the recirculated portion of the exhaust gas flow to a fuel mixture. The controller controls the ratio based at least in part on a first temperature, a second temperature of the charge flow, and a third temperature of the recirculated portion of the exhaust gas flow. The fuel mixture includes the oxidant flow and the fuel flow. The first temperature includes one or any combination of a sensed temperature of the oxidant flow, the fuel flow, or the fuel mixture.

20 Claims, 2 Drawing Sheets

(56) References Cited

U.S. PATENT DOCUMENTS

| | | | |
|---|---|---|---|
| 5,579,999 A | 12/1996 | Seiner et al. | |
| 5,601,068 A | 2/1997 | Nozaki | |
| 5,611,203 A | 3/1997 | Henderson et al. | |
| 5,611,204 A | 3/1997 | Radovanovic et al. | |
| 5,617,726 A | 4/1997 | Sheridan et al. | |
| 5,771,868 A | 6/1998 | Khair | |
| 5,785,030 A | 7/1998 | Paas | |
| 5,802,846 A | 9/1998 | Bailey | |
| 5,806,308 A | 9/1998 | Khair et al. | |
| 5,927,075 A * | 7/1999 | Khair | F02M 25/0709 123/565 |
| 5,950,420 A | 9/1999 | Geiger | |
| 6,003,315 A | 12/1999 | Bailey | |
| 6,003,316 A | 12/1999 | Baert et al. | |
| 6,009,704 A | 1/2000 | Feucht | |
| 6,009,709 A | 1/2000 | Bailey | |
| 6,035,639 A | 3/2000 | Kolmanovsky et al. | |
| 6,038,860 A | 3/2000 | Bailey | |
| 6,044,826 A * | 4/2000 | Bayerle | F02D 41/0072 123/568.16 |
| 6,062,026 A | 5/2000 | Woollenweber et al. | |
| 6,102,015 A * | 8/2000 | Tsuyuki | F02M 25/0702 123/568.16 |
| 6,116,026 A | 9/2000 | Freese, V | |
| 6,128,902 A | 10/2000 | Kolmanovsky et al. | |
| 6,164,063 A * | 12/2000 | Mendler | F01N 3/2882 60/274 |
| 6,205,785 B1 | 3/2001 | Coleman | |
| 6,209,530 B1 | 4/2001 | Faletti et al. | |
| 6,216,458 B1 | 4/2001 | Alger et al. | |
| 6,237,335 B1 | 5/2001 | Lonnqvist | |
| 6,237,336 B1 | 5/2001 | Feucht et al. | |
| 6,244,256 B1 | 6/2001 | Wall et al. | |
| 6,267,106 B1 | 7/2001 | Feucht | |
| 6,286,489 B1 | 9/2001 | Bailey | |
| 6,301,887 B1 | 10/2001 | Gorel et al. | |
| 6,338,245 B1 | 1/2002 | Shimoda et al. | |
| 6,347,519 B1 | 2/2002 | Kreso | |
| 6,425,382 B1 | 7/2002 | Marthaler et al. | |
| 6,438,948 B2 | 8/2002 | Ono et al. | |
| 6,497,095 B2 | 12/2002 | Carberry et al. | |
| 6,526,753 B1 | 3/2003 | Bailey | |
| 6,708,676 B2 * | 3/2004 | Akao | F02D 41/0072 123/568.16 |
| 6,742,335 B2 | 6/2004 | Beck et al. | |
| 7,124,751 B2 * | 10/2006 | Hardman | F02D 35/0007 123/568.21 |
| 7,201,158 B2 * | 4/2007 | Nishimura | F02D 41/0052 123/568.16 |
| 2002/0073979 A1 | 6/2002 | Lepp et al. | |
| 2002/0078935 A1 | 6/2002 | Opris | |
| 2003/0015596 A1 | 1/2003 | Evans | |
| 2003/0070425 A1 | 4/2003 | Kokusyo et al. | |
| 2003/0101713 A1 | 6/2003 | Dalla Betta et al. | |
| 2012/0291534 A1 | 11/2012 | Wang et al. | |
| 2013/0074492 A1 | 3/2013 | Chi et al. | |

* cited by examiner

SYSTEM AND METHOD FOR CONTROL OF EXHAUST GAS RECIRCULATION (EGR) UTILIZING PROCESS TEMPERATURES

BACKGROUND

The subject matter disclosed herein relates to reciprocating internal combustion engines, and more specifically, to recirculating exhaust gas with a fuel mixture through a reciprocating internal combustion engine.

A reciprocating engine utilizes pressure, such as from combustion of a mixture of fuel and air, to generate hot gases to drive a reciprocating piston. The reciprocating piston may drive a shaft and one or more loads (e.g., electrical generator, compressor) coupled to the shaft. In certain configurations, fuel and air are pre-mixed prior to ignition to reduce emissions and to improve combustion. In addition, the reciprocating engine may employ exhaust gas recirculation (EGR) to reduce formation of nitrogen oxides ($NO_x$). Unfortunately, it may be difficult to control the amount of EGR suitable for the engine.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a reciprocating internal combustion engine with one or more reaction zones configured to receive a charge flow that is configured to react within the one or more reaction zones, thereby forming an exhaust gas flow, and a controller. The charge flow includes an oxidant flow, a fuel flow, and a recirculated portion of the exhaust gas flow. The controller is configured to control a ratio of the recirculated portion of the exhaust gas flow to a fuel mixture. The controller controls the ratio based at least in part on a first temperature, a second temperature of the charge flow, and a third temperature of the recirculated portion of the exhaust gas flow. The fuel mixture includes the oxidant flow and the fuel flow. The first temperature includes one or any combination of a sensed temperature of the oxidant flow, the fuel flow, or the fuel mixture.

In a second embodiment, a system includes a first temperature sensing system configured to determine a first temperature of a fuel mixture, a second temperature sensing system configured to determine a second temperature of a charge flow, a third temperature sensing system configured to determine a third temperature of a recirculated portion of an exhaust gas flow, at least one flow control valve, and a reciprocating internal combustion engine. The fuel mixture includes an oxidant flow and a fuel flow, and the charge flow includes the fuel mixture and the recirculated portion of the exhaust gas flow. The at least one control valve is configured to control a ratio of the recirculated portion of the exhaust gas flow to the fuel mixture based at least in part on the first temperature of the fuel mixture, the second temperature of the charge flow, and the third temperature of the recirculated portion of the exhaust gas flow. The reaction zone is configured to react the charge flow to form the exhaust gas flow.

In a third embodiment, a method of operating a reciprocating internal combustion engine includes determining a first temperature of a fuel mixture, determining a second temperature of a charge flow, determining a third temperature of a recirculated portion of an exhaust gas flow, determining a ratio of the recirculated portion of the exhaust gas flow to the fuel mixture based at least in part on the first temperature, the second temperature, and the third temperature, and controlling the charge flow to the reciprocating internal combustion engine at least partially based on the ratio. The charge flow reacts within a reaction zone of the reciprocating internal combustion engine. The fuel mixture includes an oxidant flow and a fuel flow. The charge flow includes the fuel mixture and the recirculated portion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
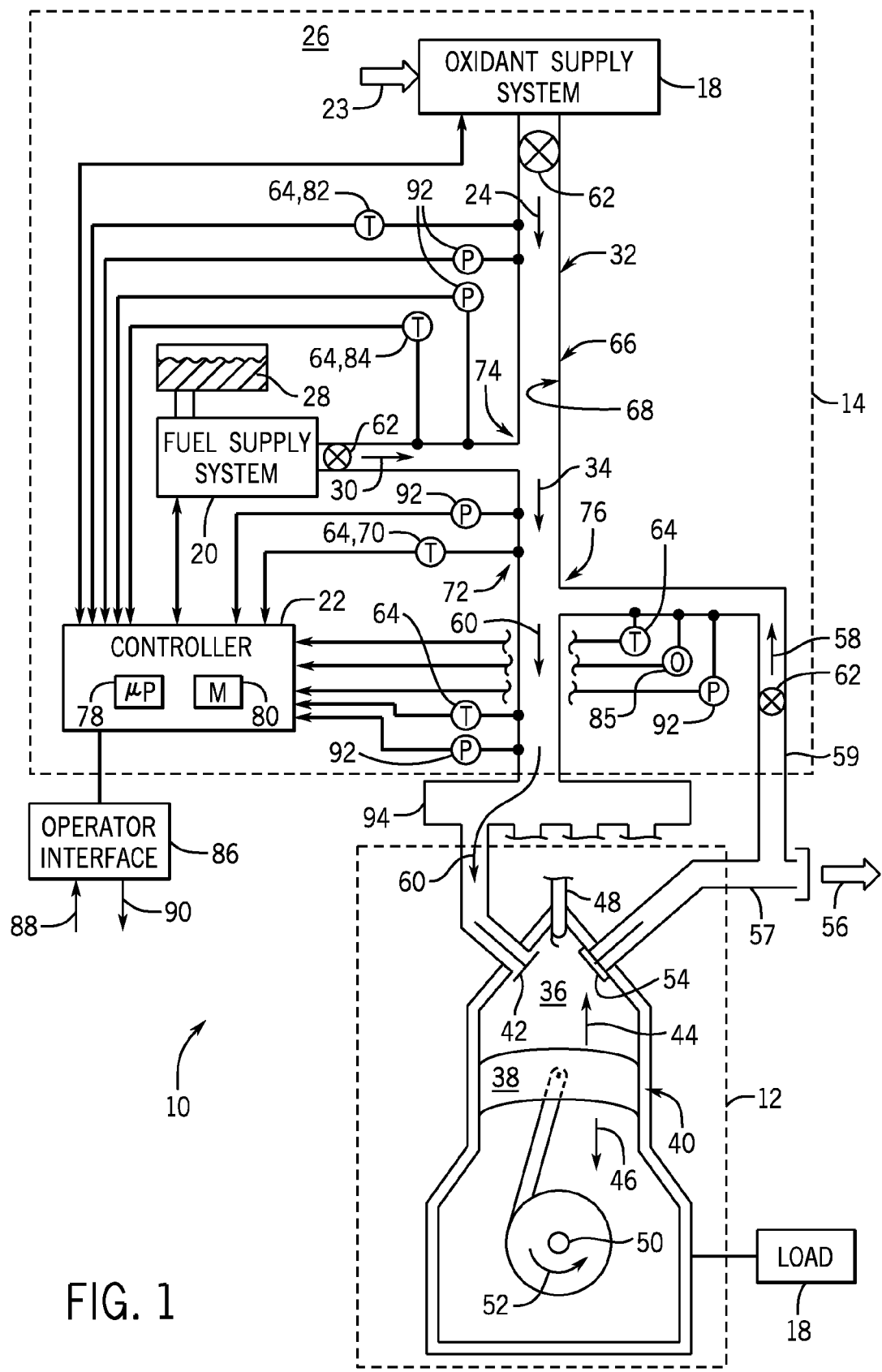
FIG. 1 is a diagram of an embodiment of a reciprocating internal combustion engine including an embodiment of an exhaust gas recirculation (EGR) system with a control system as described herein.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

An exhaust gas recirculation (EGR) system as described herein recirculates exhaust gases internally within a reciprocating internal combustion (IC) engine. Oxidant and fuel are premixed into a fuel mixture prior to injection into a reaction zone of the reciprocating IC engine. Substantially complete (e.g., stoichiometric) combustion without exhaust gas recirculation reacts approximately all the oxidant and fuel into combustion products (e.g., carbon dioxide, carbon monoxide, nitrogen oxides ($NO_x$), and water). Reactions with approximately stoichiometric quantities or surplus oxidant may react at high temperatures (e.g., approximately 2800° F.), thereby increasing $NO_x$ emissions. A portion of the exhaust gas may be recirculated to dilute the oxidant in the fuel mixture, to lower the combustion temperature, and to reduce $NO_x$ emissions. The fuel mixture and the recirculated portion of the exhaust gas may be referred to as the charge mixture. The quantity of the recirculated portion may be increased to control (e.g., reduce) the combustion temperature and the $NO_x$ emissions, and the recirculated portion may be decreased to control (e.g., increase) the stability (e.g., flame stability) of the reciprocating IC engine.

A controller and/or a valve control system may control flow rates of the oxidant, the fuel, and the recirculated portion of the exhaust gas, thereby enabling a desired composition of the charge mixture to react within the reciprocating IC engine. As discussed herein, the composition of the charge mixture may be determined by the controller based at least in part on a determined temperature of the fuel mixture, a determined temperature of the charge mixture, and a determined temperature of the recirculated portion of the exhaust gas. In some embodiments, the enthalpies of the fuel mixture, the charge mixture, and the recirculated portion of the exhaust gas are determined by the controller. In some embodiments, the determination of the composition of the charge mixture may be augmented based at least in part on a determined pressure of the fuel mixture, a determined pressure of the charge mixture, or a determined pressure of the recirculated portion of the exhaust gas, or any combination thereof. However, flow rates determined by the controller based on temperatures as described herein may be more accurate and/or robust than flow rates determined based on pressure measurements alone. For example, oxidant flow rates greater than approximately 10 pounds per minute through the flow control system may have pressure fluctuations due to turbulence. Moreover, flow determination via temperature measurements may have lower costs and/or lower system complexity than flow determination via flow meters (e.g., Venturi-type, orifice-type) and direct measurement of $NO_x$ in the exhaust gas flow.

FIG. 1 is a diagram of an embodiment of a reciprocating internal combustion (IC) engine system 10 having a reciprocating IC engine 12, a flow control system 14, and a load 16 driven by the reciprocating IC engine 12. The load 16 may include, but is not limited to, a vehicle or a stationary load. In some embodiments, the load 16 may include a compressor, a pump, an electric generator, a transmission, a propeller on an aircraft or boat, a fan, or any suitable device capable of being powered by the reciprocating IC engine 12. The flow control system 14 includes an oxidant supply system 18, a fuel supply system 20, and a controller 22 (e.g., an electronic control unit). The oxidant supply system 18 intakes an oxidant stream 23 (e.g., oxygen, air, oxidant-reduced air, or oxidant-enriched air) and supplies the oxidant flow 24. In some embodiments, the oxidant supply system 18 intakes the oxidant stream 23 from an external environment 26. The fuel supply system 20 may include a fuel reservoir 28 configured to supply a fuel flow 30 to the reciprocating IC engine 12. The fuel of the fuel flow 30 may include, but is not limited to, one or more of the following fuels: methane, ethane, ethene, propane, propylene, isobutane, butane, isopentane, pentane, hexane, heptanes, hydrogen, or gasoline. The fuel supply system 20 may supply a liquid fuel flow 30 or a gaseous fuel flow 30.

The oxidant flow 24 and the fuel flow 30 mix within a premix conduit 32 to form a fuel mixture 34 that flows to a reaction zone 36 (e.g., combustion chamber) of the reciprocating IC engine 12. As may be appreciated, the reciprocating IC engine 12 may have one or more reaction zones 36, and each reaction zone 36 is adjacent to a reciprocating piston 38 that moves within a respective cylinder 40. For example, some reciprocating IC engines 12 may include 1, 2, 3, 4, 5, 6, 7, 8, 9, 10, 12, 14, 16, or more reaction zones 36 (e.g., combustion chambers) and respective reciprocating pistons 38. The fuel mixture 34 may be injected into the reaction zone 36 via an intake valve 42 and compressed via the reciprocating piston 38 moving in a first direction 44. The fuel mixture 34 reacts (e.g., combusts) within the reaction zone 36, thereby driving the reciprocating piston 38 in a second direction 46 as combustion products from the reaction expand. In some embodiments, one or more spark plugs 48 induce the reaction (e.g., ignite the fuel mixture 34) in the reaction zone 36. The one or more reciprocating pistons 38 are coupled to a drive shaft 50 (e.g., crank shaft) that is drivingly coupled to the load 16, thereby rotating the drive shaft 50 in a third direction 52 to drive the load 16. An exhaust valve 54 releases the reacted combustion products from the reaction zone 36 through an exhaust conduit 57 as an exhaust gas flow 56.

The flow control system 14 may recirculate a portion 58 of the exhaust gas flow 56 through a recirculation conduit 59 to the premix conduit 32 to form the charge flow 60. In some embodiments, the controller 22 may control one or more of the oxidant flow 24, the fuel flow 30, and the recirculated portion 58 of the exhaust gas flow 56 via flow control valves 62. The controller 22 may control a flow rate of the fuel mixture 34 by controlling the oxidant flow 24 and the fuel flow 30. The controller 22 controls the composition and flow rate of the charge flow 60 based at least in part on a first temperature of the fuel mixture 34, a second temperature of the charge flow 60, and a third temperature of the recirculated portion 58 of the exhaust gas flow 56.

Multiple temperature sensors 64 may transmit feedback signals to the controller 22 based at least in part on a temperature of a flow proximate to the respective temperature sensor 64. The temperatures sensors 64 may transmit intermittently, at regular intervals, or substantially continuously, feedback signals indicative of directly or indirectly sensed temperatures, or may provide the actual temperature values of the respective flows. Each temperature sensor 64 may include, but is not limited to, a thermocouple, a resistor temperature detector (RTD), a thermistor, a pyrometer (e.g., a radiation and/or optical pyrometer), or a thermometer, or any combination thereof. The temperatures sensors 64 may be arranged on an exterior wall 66 of the premix conduit 32, on an interior wall 68 of the premix conduit 32, or through the interior wall 68 and within the respective flow (e.g., oxidant flow 24, fuel flow 30, fuel mixture 34, recirculated portion 58, charge flow 60). In some embodiments, a temperature sensor 64 may be arranged at a position that enables the temperature sensor 64 to transmit a feedback signal representative of a sufficiently mixed flow. For example, a first temperature sensor 70 may be arranged at a position 72 downstream of the introduction of the fuel flow 30 to the oxidant flow 24 where the fuel mixture 34 is a substantially homogenous mixture based on testing, calibration, or fluid dynamic calculations. In some embodiments, the temperature of a substantially homogenous mixture may vary less than approximately 1 degree C. across a cross-section of the mixture.

The controller 22 may determine an exhaust gas recirculation (EGR) ratio between the mass flow rate of the recirculated portion 58 of the exhaust gas flow 56 and the mass flow rate of the fuel mixture 34 based at least in part on transmitted signals from the temperature sensors 64. The equations presented herein describe relationships between the respective flows and the respective temperatures. The mass flow of the fuel mixture 34 after junction 74 prior to mixing with the recirculated portion 58 may be determined from Equation (1), and the mass flow of the charge flow 60 at junction 76 may be determined from Equation (2):

$$M_{mixture} = M_{oxidant} + M_{fuel} \quad (1)$$

$$M_{charge} = M_{mixture} + M_{egr} \quad (2)$$

where $M_{mixture}$ is the mass flow rate of the fuel mixture 34, $M_{oxidant}$ is the mass flow rate of the oxidant flow 24, $M_{fuel}$ is the mass flow rate of the fuel flow 30, $M_{charge}$ is the mass flow rate of the charge flow 60, and $M_{egr}$ is the mass flow rate of the recirculated portion 58. In some embodiments, $M_{oxidant}$ may be between approximately 0.45 to 433 kgs/minute (e.g., approximately 1 to 955 lbs/minute), approximately 4.5 to 300 kgs/minute (e.g., approximately 10 to 660 lbs/minute), or approximately 45 to 136 kgs/minute (e.g., approximately 100 to 300 lbs/minute). $M_{fuel}$ may be between approximately 0.02 to 30 kgs/minute (e.g., approximately 0.04 to 66 lbs/minute), approximately 0.2 to 20 kgs/minute (e.g., approximately 0.4 to 44 lbs/minute), or approximately 2 to 10 kgs/minute (e.g., approximately 4.4 to 22 lbs/minute). As may be appreciated, Equations (1) and (2) describe a mass balance of the respective flows that enter the reaction zone 36. The controller 22 controls one or more of the respective flows to control the EGR ratio determined from Equation (3):

$$\% \, EGR = \frac{M_{egr}}{M_{mixture}} \quad (3)$$

where % EGR is the EGR ratio. Increasing the EGR ratio over a lower threshold may decrease the combustion temperature and the $NO_x$ emissions from the reciprocating IC engine 12; however, EGR ratios over an upper threshold of approximately 40 percent may increase misfiring of the one or more reciprocating pistons 34, thereby decreasing the stability (e.g., flame or combustion stability) of the reciprocating IC engine 12. Accordingly, $M_{egr}$ may be between approximately 1 and 40 percent, approximately 5 to 35 percent, or approximately 10 to 25 percent of $M_{mixture}$.

The enthalpy of a flow may be determined based at least in part on the mass flow rate, a specific heat of the flow, and a temperature of the flow. Equation (4) describes the specific heat of the charge flow 60 ($M_{charge}$):

$$M_{charge} * Cp_{charge} = M_{mixture} * Cp_{mixture} + M_{egr} * Cp_{egr} \quad (4)$$

where $Cp_{charge}$ is the specific heat of the charge flow 60, $Cp_{mixture}$ is the specific heat of recirculated the fuel mixture 34, and $Cp_{egr}$ is the specific heat of the recirculated portion 58 of the exhaust gas flow 56. Equation (4) may be rewritten with Equation (2) to define $Cp_{charge}$ in terms of $Cp_{mixture}$ and $Cp_{egr}$, as shown in Equation (5):

$$Cp_{charge} = \frac{M_{egr} * Cp_{egr} + M_{mixture} * Cp_{mixture}}{M_{egr} + M_{mixture}} \quad (5)$$

According to the first law of thermodynamics, the enthalpy ($Q_{charge}$) of the charge flow 60 leaving junction 76 is equal to the sum of the enthalpy ($Q_{mixture}$) of the fuel mixture 34 and the enthalpy ($Q_{egr}$) of the recirculated portion 58 entering the junction 76, as shown in Equation (6):

$$Q_{charge} = Q_{mixture} + Q_{egr} \quad (6)$$

$Q_{charge}$, $Q_{mixture}$, and $Q_{egr}$ are defined respectively by Equations (7)-(9):

$$Q_{charge} = M_{charge} * Cp_{charge} * (T_{charge} - T_{ref}) \quad (7)$$

$$Q_{mixture} = M_{mixture} * Cp_{mixture} * (T_{mixture} - T_{ref}) \quad (8)$$

$$Q_{egr} = M_{egr} * Cp_{egr} * (T_{egr} - T_{ref}) \quad (9)$$

where $T_{charge}$ is the temperature of the charge flow 60, $T_{mixture}$ is the temperature of the fuel mixture 34, $T_{egr}$ is the temperature of the recirculated portion 58, and $T_{ref}$ is a reference temperature. In some embodiments, $T_{mixture}$ may be approximated as the temperature of the oxidant flow 24 ($T_{oxidant}$), the temperature of the fuel flow 30 ($T_{fuel}$), or any combination thereof. Additionally, or in the alternative, $T_{mixture}$ may be sensed directly by a temperature sensor 64 configured to sense the temperature of the fuel mixture 34, or indirectly utilizing one or more of $T_{oxidant}$ and $T_{fuel}$.

The enthalpy of the charge flow 60 may be determined through substitution of Equations (7)-(9) into Equation (6) and setting $T_{ref}$ equal to zero, forming Equation (10):

$$M_{charge} * Cp_{charge} * T_{charge} = M_{mixture} * Cp_{mixture} * T_{mixture} + M_{egr} * Cp_{egr} * T_{egr} \quad (10)$$

Further substitution of Equations (2) and (5) into Equation (10) and algebraic manipulations result in Equation (11):

$$M_{egr} * Cp_{egr} * (T_{charge} - T_{egr}) = M_{mixture} * Cp_{mixture} * (T_{mixture} - T_{charge}) \quad (11)$$

From Equation (11), the EGR ratio may be determined as shown by Equation (12):

$$\% \, EGR = \frac{M_{egr}}{M_{mixture}} = \frac{Cp_{mixture} * (T_{mixture} - T_{charge})}{Cp_{egr} * (T_{charge} - T_{egr})} \quad (12)$$

In some embodiments, the specific heat of the fuel mixture 34 may be approximately equal to the specific heat of the recirculated portion 58, thereby further simplifying Equation (12) into Equation (13):

$$\% \, EGR = \frac{M_{egr}}{M_{mixture}} = \frac{T_{mixture} - T_{charge}}{T_{charge} - T_{egr}} \quad (13)$$

Utilizing Equation 12 or Equation 13, a processor 78 of the controller 22 may determine the EGR ratio of the recirculated portion 58 to the fuel mixture 34 based at least in part on the sensed temperature of the fuel mixture 34, the sensed temperature of the charge flow 60, and the sensed temperature of the recirculated portion 58 of the exhaust gas flow 56. In some embodiments, the controller 22 may determine the EGR ratio of the recirculated portion 58 to the fuel mixture 34 based at least in part on the above equations, computer models, historical data, trend data, current sensor data, fleet data, look-up tables, graphs, or any combination thereof. The desired EGR ratio may be based at least in part on an operating mode of the reciprocating IC engine 12. For example, the desired EGR ratio may be different for a startup sequence and/or a shut down sequence relative to a steady-state sequence. In some embodiments, the desired EGR ratio may be based at least in part on the load 16, such that the desired EGR ratio for a relatively small load (1000 hp) is lower than the desired EGR ratio for a relatively large load (5000 hp). The controller 22 may store instructions and/or temperature signals to determine % EGR in a memory 80. The memory 80 may include, but is not limited to, a volatile and/or non-volatile memory. For example, the memory 80 may include one or more hard drives, flash memory, read-only memory, random access memory, or any combination thereof.

Using the controller 22, the temperature of the fuel mixture 34 may be determined directly via the first temperature sensor 70, or indirectly via a second temperature sensor 82 configured to transmit a second temperature signal based on the temperature of the oxidant flow 24 and a third temperature sensor 84 configured to transmit a third temperature signal based on the temperature of the fuel flow 30. In some embodiments, the controller 22 may determine a fuel-air ratio (% F/A) of the fuel flow 30 to the oxidant flow 24 in the fuel mixture 34 in a similar manner to determining the EGR ratio. For example, the controller 22 may utilize Equation 14:

$$\% \ F/A = \frac{M_{fuel}}{M_{oxidant}} = \frac{T_{oxidant} - T_{mixture}}{T_{mixture} - T_{fuel}} \quad (14)$$

where $T_{oxidant}$ is the temperature of the oxidant flow 24 and $T_{fuel}$ is the temperature of the fuel flow 30. The controller 22 may control the fuel-air ratio by adjusting at least one of the oxidant flow 24 and the fuel flow 30.

Additionally, or in the alternative, an oxygen sensor 85 (e.g., lambda sensor) coupled to the controller 22 may sense the oxygen concentration in the recirculated portion 58 of the exhaust gas flow 56. The controller 22 may determine the fuel-air ratio based on the oxygen concentration in the recirculated portion 58 sensed by the oxygen sensor 85. In some embodiments, the controller 22 may compare the fuel-air ratio determined from the oxygen sensor 85 feedback to the fuel-air ratio determined via Equation 14. Accordingly, the controller 22 may utilize the oxygen sensor 85 to verify the fuel-air ratio determined from Equation 14, the controller 22 may utilize the fuel-air ratio determined from Equation 14 to verify the oxygen concentration sensed by the oxygen sensor 85, or the controller 22 may utilize the fuel-air ratio determined from Equation 14 and the oxygen concentration sensed by the oxygen sensor 85 to determine and control the fuel-air ratio of the fuel flow 30 to the oxidant flow 24 in the fuel mixture 34.

The controller 22 may be coupled to an operator interface 86 (e.g., display with a graphical user interface) configured to receive an operator input 88 or to provide an operator output 90 to the operator. For example, the operator may input specific heat values for the oxidant flow 24, the fuel flow 30, or the recirculated portion 58, upper or lower EGR ratio thresholds, a desired EGR ratio, a desired threshold flow rate for the oxidant flow 24, the fuel flow 30, or the recirculated portion 58, or any combination thereof. In some embodiments, the operator may input identification information for equipment, such as serial numbers or model numbers. The operator interface 86 may facilitate operator control of the speed and/or loading of the reciprocating IC system 10. In some embodiments, the operator interface 86 may display operational information on the status of the reciprocating IC system 10, such as the speed, the load 16, the fuel efficiency, the fuel consumption, the operating temperature, the EGR ratio, the fuel level, trends, emissions levels (e.g., $NO_x$, CO, $CO_2$, $SO_x$), and so forth.

In some embodiments, one or more pressure sensors 92 may transmit pressure signals to the controller 22 based at least in part on a measured pressure of the oxidant flow 24, the fuel flow 30, the fuel mixture 34, the recirculated portion 58, or the charge flow 60, or any combination thereof. The controller 22 may utilize the pressure signals to augment the determination of the % EGR. For example, the controller 22 may utilize one or more pressure sensors 92, orifice plates, or flow meters to determine the flow rate of one or more flows.

FIG. 1 further illustrates a schematic view of an embodiment of the flow control system 14 configured to supply the charge flow 60 to the reaction zone 36 of the reciprocating IC engine 12 and to recirculate a portion 58 of the exhaust gas flow 56 from the reciprocating IC engine 12. The reciprocating IC engine system 10 may include multiple reciprocating pistons 38 and multiple reaction zones 36. In some embodiments, the system 14 may supply the charge flow 60 to each reaction zone 36 via a respective premix conduit 32. In other embodiments, the premix conduit 32 may couple with a charge manifold 94 configured to supply the charge flow 60 to each of the reaction zones 36.

Upon determination of the EGR ratio between the recirculated portion 58 and the fuel mixture 34, the controller 22 may adjust the flow rate of at least one of the fuel mixture 34 and the recirculated portion 58 that are mixed to form the charge flow 60. In some embodiments, the controller 22 adjusts the flow rate of the fuel mixture 34 by adjusting the flow rate of the oxidant flow 24. Additionally, or in the alternative, the controller 22 adjusts the flow rate of the fuel mixture 34 by adjusting the flow rate of the fuel flow 30. For example, the controller 22 may adjust the respective flow control valves 62 of the oxidant supply system 62 and/or the fuel supply system 20. The controller 22 may adjust the flow control valve 62 coupled to the recirculation conduit 59 to control the recirculated portion 58 of the exhaust gas flow 56. In summary, the controller 22 may adjust the flow rate of the oxidant flow 24, the flow rate of the fuel flow 30, the flow rate of the fuel mixture 34, or the flow rate of the recirculated portion 58 of the exhaust gas flow 56, or any combination thereof.

Figure 2:
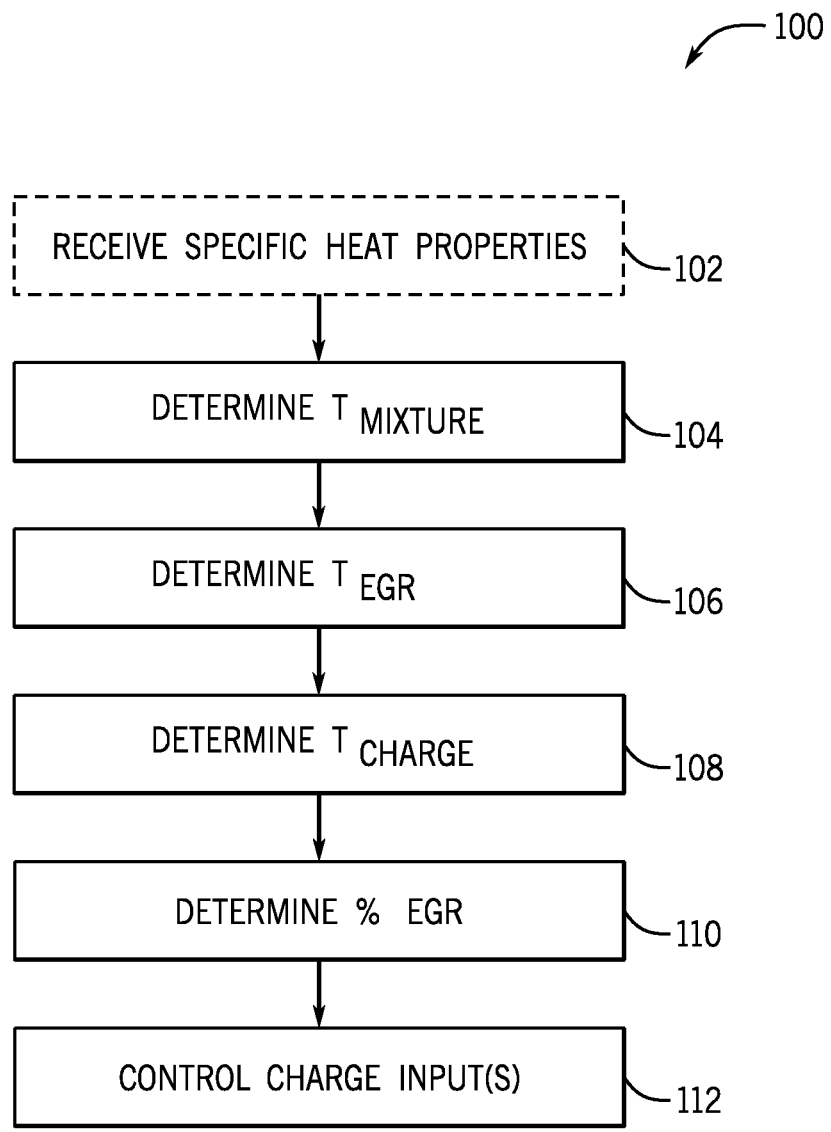
FIG. 2 is a flow chart of an embodiment of a method of controlling flows into the reciprocating internal combustion engine.

FIG. 2 illustrates a method 100 of an embodiment for controlling the EGR ratio between the recirculated portion 58 of the exhaust gas flow 56 and the fuel mixture 34 supplied to the reciprocating IC engine 12 of FIG. 1. Optionally, the controller 22 may receive (block 102) specific heat properties related to the respective flows (e.g., oxidant flow 24, fuel flow 30, fuel mixture 34, recirculated portion 58 of the exhaust gas flow 56). The controller 22 may determine (block 104) the temperature ($T_{mixture}$) of the fuel mixture 34 via one or more temperature sensors 64. For example, a temperature sensor 64 may transmit a signal based at least in part on the temperature of the fuel mixture 34. Additionally, or in the alternative, the controller 22 may determine the temperature of the fuel mixture 34 via a relationship between a temperature of the oxidant flow 24 and a temperature of the fuel flow 30. For example, the controller 22 may determine the temperature of the fuel mixture 34 based at least in part on the flow rates of the oxidant flow 24 and the fuel flow 30, and the temperatures of the oxidant flow 24 and the fuel flow 30. The controller 22 also determines (block 106) the temperature ($T_{egr}$) of the recirculated portion 58 of the exhaust gas flow 56 via one or more temperature sensors 64. In some embodiments, $T_{egr}$ may be between approximately 40 to 80 degrees C. (e.g., approximately 104 to 176 degrees F.), between approximately 50 to 75 degrees C. (e.g., approximately 122 to 167 degrees F.), or between approximately 55 to 70 degrees C. (e.g., approximately 131 to 158 degrees F.) or more. The controller 22 further determines (block 108) the temperature ($T_{charge}$) of the charge flow via one or more temperature sensors 64, where the charge flow includes the oxidant flow 24, the fuel flow 30, and the recirculated portion 58 of the exhaust gas flow 56. The one or more temperature sensors 64 may be arranged at a point to enable the signal transmitted to the controller 22 to correspond to a substantially homogenous mixture within the charge flow.

Utilizing one of Equations (12) or (13), the controller 22 determines (block 110) the EGR ratio between the recirculated portion 58 of the exhaust gas flow 56 and the fuel mixture 34 supplied to the reciprocating IC engine. Based at least in part on the EGR ratio, the controller 22 may control (block 112) the charge flow inputs, such as the oxidant flow 24, the fuel flow 30, and/or the recirculated portion 58 of the exhaust gas flow 56. The controller 22 may control one or more of the charge flow inputs in a feedback loop to adjust the EGR ratio to a desired value, such as between approximately 15 to 40%.

In some embodiments, the controller 22 may control the charge flow input and adjust the EGR ratio in order to reduce the $NO_x$ emissions below a desired level (e.g., approximately 500 to 1000 ppm), to control the combustion temperature between a desired range (e.g., approximately 650 to 980 degrees C. or 1200 to 1800 degrees F.), or to increase the stability of the reciprocating IC engine. For example, the memory of the controller 22 may store one or more look-up tables that relate $NO_x$ emissions, combustion temperature, and/or engine stability to various values for the EGR ratio between the recirculated portion of the exhaust gas flow and the fuel mixture, various to fuels, and/or to various oxidant flows.

Technical effects of the invention include the determination and control of the EGR ratio between the recirculated portion of the exhaust gas flow and the fuel mixture provided to a reciprocating IC engine based at least in part on the temperature of the fuel mixture, the temperature of the charge flow supplied to the reciprocating IC engine, and the temperature of the recirculated portion. The controller may determine the EGR ratio utilizing temperature sensors with or without pressure sensors. The controller may determine the enthalpies of the respective flows and may control one or more of the fuel mixture or the recirculated portion to control the EGR ratio. In some embodiments, the controller may control the oxidant flow or the fuel flow to adjust the fuel mixture. The controller may control the EGR ratio in order to affect the $NO_x$ emissions from the reciprocating IC engine, to reduce the combustion temperature of the reciprocating IC engine, and/or to increase the stability of operation of the reciprocating IC engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a reciprocating internal combustion engine comprising one or more reaction zones configured to receive a charge flow, wherein the charge flow is configured to react within the one or more reaction zones and to form an exhaust gas flow, and the charge flow comprises an oxidant flow, a fuel flow, and a recirculated portion of the exhaust gas flow; and
a controller configured to control a ratio of the recirculated portion of the exhaust gas flow to a fuel mixture comprising the oxidant flow and the fuel flow based at least in part on a first temperature, a second temperature of the charge flow, and a third temperature of the recirculated portion of the exhaust gas flow, wherein the first temperature comprises one or any combination of a sensed temperature of the oxidant flow, the fuel flow, or the fuel mixture.

2. The system of claim 1, wherein the controller is configured to control the ratio of the recirculated portion of the exhaust gas flow to the fuel mixture based on the equation:

$$\% \text{ EGR} = (Cp_{mixture} * (T_{mixture} - T_{charge}))/(Cp_{egr} * (T_{charge} - T_{egr}))$$

wherein % EGR is the ratio, $Cp_{mixture}$ is a specific heat of the fuel mixture, $T_{mixture}$ is the first temperature, $T_{charge}$ is the second temperature, $Cp_{egr}$ is a specific heat of the recirculated portion, and $T_{egr}$ is the third temperature.

3. The system of claim 2, wherein $Cp_{mixture}$ equal to $Cp_{egr}$.

4. The system of claim 2, wherein the controller comprises a memory configured to store a first value for $Cp_{mixture}$ and a second value for $Cp_{egr}$.

5. The system of claim 1, comprising a fuel-mixture temperature sensor configured to transmit a first signal to the controller based at least in part on the sensed temperature of the fuel mixture.

6. The system of claim 1, comprising an oxidant temperature sensor configured to transmit a first signal to the controller based at least in part on a sensed fourth temperature of the oxidant flow, a fuel temperature sensor configured to transmit a second signal to the controller based at least in part on a sensed fifth temperature of the fuel flow, wherein the controller is configured to determine the first temperature based at least in part on the sensed fourth temperature and the sensed fifth temperature.

7. The system of claim 1, wherein the reciprocating internal combustion engine comprises a plurality of reciprocating pistons disposed in a respective plurality of cylinders, and each reciprocating piston of the plurality of reciprocating pistons is configured to reciprocate in a respective cylinder of the plurality of cylinders to compress and expand a respective reaction zone of the one or more reaction zones, and each respective reaction zone of the one or more reaction zones is configured to receive the charge flow.

8. The system of claim 1, comprising one or more pressure sensors coupled to the controller, wherein each pressure sensor of the one or more pressure sensors is configured to transmit a pressure signal to the controller based at least in part a pressure of the charge flow, a pressure of the oxidant flow, a pressure of the fuel flow, a pressure of the fuel mixture flow, a pressure of the exhaust gas flow, or any combination thereof, and the controller is configured to control the ratio based at least in part on the one or more pressure signals received from the one or more pressure sensors.

9. The system of claim 1, wherein the controller is configured to control the ratio via control of the oxidant flow.

10. The system of claim 1, wherein the controller is configured to control the ratio via control of only the recirculated portion of the exhaust gas flow or via control of both the recirculated portion of the exhaust gas flow and control of the oxidant flow.

11. The system of claim 1, wherein the controller is configured to control the ratio to be between approximately 15 and 40 percent.

12. A system, comprising:
a first temperature sensing system configured to determine a first temperature of a fuel mixture, wherein the fuel mixture comprises an oxidant flow and a fuel flow;
a second temperature sensing system configured to determine a second temperature of a charge flow, wherein the charge flow comprises the fuel mixture and a recirculated portion of an exhaust gas flow;
a third temperature sensing system configured to determine a third temperature of the recirculated portion of the exhaust gas flow;
at least one flow control valve configured to control a ratio of the recirculated portion of the exhaust gas flow to the fuel mixture based at least in part on the first temperature of the fuel mixture, the second temperature of the charge flow, and the third temperature of the recirculated portion of the exhaust gas flow; and
a reciprocating internal combustion engine comprising a reaction zone configured to react the charge flow to form the exhaust gas flow.

13. The system of claim 12, wherein the first temperature sensing system is configured to determine the first temperature based at least in part on a fourth temperature of the oxidant flow and a fifth temperature of the fuel flow.

14. The system of claim 12, wherein the at least one flow control valve is configured to control the ratio of the recirculated portion of the exhaust gas flow to the fuel mixture based on the equation:

$$\% \text{ EGR} = (Cp_{mixture} * (T_{mixture} - T_{charge}))(Cp_{egr} * (T_{charge} - T_{egr}))$$

wherein % EGR is the ratio, $Cp_{mixture}$ is a specific heat of the fuel mixture, $T_{mixture}$ is the first temperature, $T_{charge}$ is the second temperature, $Cp_{egr}$ is a specific heat of the recirculated portion, and $T_{egr}$ is the third temperature.

15. The system of claim 12, wherein at least one flow control valve comprises an oxidant flow control valve configured to control the ratio via control of the oxidant flow.

16. A method of operating a reciprocating internal combustion engine, comprising:
determining a first temperature of a fuel mixture, wherein the fuel mixture comprises an oxidant flow and a fuel flow;
determining a second temperature of a charge flow, wherein the charge flow comprises the fuel mixture and a recirculated portion of an exhaust gas flow;
determining a third temperature of the recirculated portion of the exhaust gas flow;
determining a ratio of the recirculated portion of the exhaust gas flow to the fuel mixture based at least in part on the first temperature, the second temperature, and the third temperature; and
controlling the charge flow to the reciprocating internal combustion engine at least partially based on the ratio, wherein the charge flow reacts within a reaction zone of the reciprocating internal combustion engine.

17. The method of claim 16, wherein the ratio of the recirculated portion of the exhaust gas flow to the fuel mixture is determined based on the equation:

$$\% \text{ EGR} = (Cp_{mixture} * (T_{mixture} - T_{charge}))(Cp_{egr} * (T_{charge} - T_{egr}))$$

wherein % EGR is the ratio, $Cp_{mixture}$ is a specific heat of the fuel mixture, $T_{mixture}$ is the first temperature, $T_{charge}$ is the second temperature, $Cp_{egr}$ is a specific heat of the recirculated portion, and $T_{egr}$ is the third temperature.

18. The method of claim 17, comprising receiving a first value of $Cp_{mixture}$ and a second value of $Cp_{egr}$ via an operator interface.

19. The method of claim 16, wherein controlling the charge flow comprises controlling at least one of the oxidant flow or the recirculated portion of the exhaust gas flow based at least in part on the ratio.

20. The method of claim 18, wherein controlling the charge flow comprises controlling the ratio to be between approximately 15 and 40 percent via a feedback loop.

* * * * *